United States Patent [19]

Pichl

[11] 4,191,238
[45] Mar. 4, 1980

[54] CONNECTING ROD OR THE LIKE AND METHOD AND MOULD FOR PRODUCING CONNECTING RODS OR THE LIKE

[75] Inventor: Heinz Pichl, Upsala, Sweden

[73] Assignee: AB Volvo Penta, Gothenburg, Sweden

[21] Appl. No.: 787,870

[22] Filed: Apr. 15, 1977

[30] Foreign Application Priority Data

Apr. 28, 1976 [SE] Sweden ............................ 7604870

[51] Int. Cl.² ........................ B22D 19/00; G05G 1/00
[52] U.S. Cl. ............................... 164/100; 29/156.5 A; 164/126; 164/128; 428/653; 74/579 E
[58] Field of Search ............... 428/653; 164/122, 100, 164/126, 128; 29/156.5 A; 74/579 R, 579 E, 580, 586, 587, 588, 593, 594

[56] References Cited

U.S. PATENT DOCUMENTS

| | | | |
|---|---|---|---|
| 1,323,605 | 12/1919 | Meyer et al. | 74/594 X |
| 1,391,675 | 9/1921 | Emery | 164/126 |
| 1,939,628 | 12/1933 | Liebmann | 164/100 |
| 1,998,666 | 4/1935 | Frank | 164/100 |
| 2,071,193 | 2/1937 | Angle | 29/156.5 A X |
| 2,080,641 | 5/1937 | Templin | 29/156.5 A |
| 2,881,491 | 4/1959 | Jominy et al. | 164/102 |
| 2,974,380 | 3/1961 | Jominy et al. | 164/126 X |
| 2,995,953 | 8/1961 | De Fazi | 74/579 E |
| 3,238,811 | 3/1966 | Longstreth | 74/579 E |
| 3,266,339 | 8/1966 | Schlechtendahl | 74/579 |
| 3,338,113 | 8/1967 | Camp et al. | 74/579 |
| 3,425,112 | 2/1969 | Roemer | 428/653 X |
| 3,482,468 | 12/1969 | DeBiasse | 74/579 |
| 3,652,344 | 3/1972 | Kingsbury et al. | 428/653 X |
| 3,842,488 | 10/1974 | Mitchell | 164/100 |
| 4,008,051 | 2/1977 | Cadle | 428/653 X |

FOREIGN PATENT DOCUMENTS 580121 7/1959 Canada ................................. 428/653

*Primary Examiner*—Samuel Scott
*Assistant Examiner*—Wesley S. Ratliff, Jr.
*Attorney, Agent, or Firm*—Baldwin & Yeager

[57] ABSTRACT

The invention relates to a method and mould for the production of a connecting rod or similar object having a body of cast metal, expecially a non-ferrous metal such as a zinc or aluminum alloy, the body comprising a connecting rod shank and of which at least one connecting rod end is provided with a bearing race element of hardened steel, typically an outer race for a roller or needle bearing. The invention particularly pertains to connecting rods having bearing surfaces subject to high loads and which are characterized by the absence of "pockets" in which contaminated lubricant might accumulate. Such connecting rods are, for instance, used in two-stroke combustion engines as for instance outboard motors for boats or the like, with rollers or needles disposed between the said outer race and the journal of the crank shaft throw.

6 Claims, 4 Drawing Figures

CONNECTING ROD OR THE LIKE AND METHOD AND MOULD FOR PRODUCING CONNECTING RODS OR THE LIKE

Hitherto, connecting rods generally have been manufactured by drop forging from steel or by casting from light metal or the like, having moulded or pressed into place in the smaller connecting rod end a bushing of bearing bronze or a needle bearing for receiving the piston pin, while the crank shaft bearing in the larger connecting rod end has been in the form of a split bearing with the cap held in place by means of connecting rod bolts. In that case the crank shaft outer bearing race itself comprises two semicircular cups of hardened steel. The method is rather expensive and the main object of the present invention is to provide a connecting rod having a hardened steel bearing race and of better quality than connecting rods having bearings comprising semicircular cups which are characterized by expansion greater than the expansion of an integral or continuous outer race element.

According to the invention said object is solved as stated in the accompanying claims. Generally, the term annealing temperature means the temperature at which the degree of hardness of hardened steel declines (full annealing temperature, austenitic or ferritic temperature, for example). When using for instance zinc or alloys having high contents of zinc in the body, casting temperatures of about 500° are encountered and hardened alloyed steel grades having for instance high contents of chrome and vanadium have annealing temperatures of about the same level. Preferably, however, the described accelerated cooling of the respective portions of the connecting rod is used during casting. Hereby is achieved that for the connecting rod body and the bearing races also metals having larger difference between the casting temperature at one hand and the annealing temperature at the other hand may be used, for instance aluminum and aluminum alloys, respectively, for the body, and steel grades cheaper than chrome-vanadium steel for the bearing race. Due to the different heat conductivities and coefficients of heat expansion of the metals, aluminum or the like will be stronger and tougher and the bearing race will be connected thoroughly to the connecting rod body moulded therearound.

First of all, said cooling makes it possible to cast a prefinished bearing race into the connecting rod body of a cast metal having considerably higher casting temperature than the annealing temperature of the bearing steel without any harmful effect on the bearing race surface. Connecting rod bearing races have to be made of very tough and hard steel of a high quality and the finish thereof, obtained by lapping or honing, has to be very fine. The casting temperature of aluminum alloys is approximately 900° C., while the annealing temperature of the bearing bushing steel may be from approximately 250° C. for carbon steel to 600° C. for alloyed high temperature steel grades. Thus, a casting into aluminum or the like carried out in a conventional manner would result in effective destruction of the bearing race since the temperature of the inserted race would quickly exceed the annealing temperature due to heat conduction from the solidifying cast metal.

During casting the heat protection of the internal surface of the bearing race preferably may be further improved on the one hand by arranging cooling from the external side of the connecting rod head or enlarged end portion including the part thereof disposed toward and connecting with the shank of the rod, such part being in the nature of a throat portion, and on the other hand by properly dimensioning the wall thickness of the bearing race, preferably in the range of about 5 to 15% of the internal diameter of the race.

Generally, the connecting rods are produced with a shank profile in the shape of a horizontal "I" in cross-section and with a plan view shape of the shank diverging from the smaller connecting rod end for the piston pin bearing to the larger connecting rod end for the crank shaft bearing. Thus, in conventional construction, at the connection point of the connecting rod shaft to the larger connecting rod end there is a distance of about 20-30% of the external circumference of the connecting rod shank end joined along the head periphery and thus not available for any cooling measures. According to the present invention it is suggested that for technological reasons the conventional shank portion of the rod is altered in such a manner that the portion connected to the connecting rod end referred to herein as a throat, is made fork shaped. Thus, the legs of the fork are formed by the two laterally disposed flange portions of the I-profile while a reduced or eliminated portion of the web therebetween provides space for arranging auxiliary cooling elements in the mould. This reduction or elimination of the web in the throat portion of the shank does not result in any noticeable weakening of the rod and, besides, furthermore, if desired, the flanges may be so designed that the height thereof is greater in the throat region where the web is missing or where it is less thick.

The casting of the bearing bushing into the connecting rod body may be promoted on the one hand by suitably dimensioning the wall thickness of the connecting rod end, preferably within the range of about 7 to 20% of the internal diameter of the connecting rod end, and on the other hand by providing the outer surface of the bearing race which is to be in contact with the rod metal with engagement promoting means. There may, for instance, be individual depressions or continuous grooves formed in the external face of the steel race element. However, with consideration of the heat protecting function of the wall thickness of the bearing surface when casting, the engagement promoting means are preferably made protruding, for instance in the shape of individual outwardly extending tabs or ears or in the form of one or more continuous ridges.

In a preferred embodiment, the mould for performing the method according to the invention generally comprises at least one core onto which a bearing race element may be slipped and within which the cooling medium may be circulated for cooling the internal surface of the bearing race element, and further the mould comprises cooling channels in the circumferential portions of the mould around the connecting rod end supporting the bearing rod element in order to cool the external surface of the connecting rod end.

In order to cool said external surface also in the connection or throat region of the shank, the shank preferably is formed in the said fork shaped fashion, and then the mould comprises an auxiliary cooling mandrel either in the lower portion or the upper portion, or a single through-going cooling mandrel, the external shape of which forms the corresponding surfaces of the throat portion of the connecting rod shank. In the first mentioned case, the cooling mandrels may be so arranged that in the interconnected state of the mould a free space is left therebetween for the web of the connecting rod shank of unaltered thickness, or of reduced thickness, or the space may be eliminated by providing that the cooling mandrels are in contact with each other between the flange portions of the shank and the web of the I-profile is completely eliminated in the region of the mandrels. When using a single transverse cooling mandrel the last mentioned shape, that is, with some or all of the web in the throat region eliminated, is of course always obtained. Preferably, for the cooling mandrel or mandrels, there is selected a plan view shape generally corresponding to a shoe heel, or of generally triangular shape, with more or less rounded corners adjacent the wider front edge, which defines the limits of the connecting rod shank end, in the space between the fork legs of the shaft.

A connecting rod or a similar object produced according to the method of the invention and/or in the mould according to the invention is characterized by the features stated in the accompanying claims. Due to the fact that the bearing race element itself may be produced in a manner well established within the ball and roller bearing industry for producing external races for roller or needle bearings, considerable savings of costs are obtained, for the complete connecting rod in the order of 60%.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Figure 1:
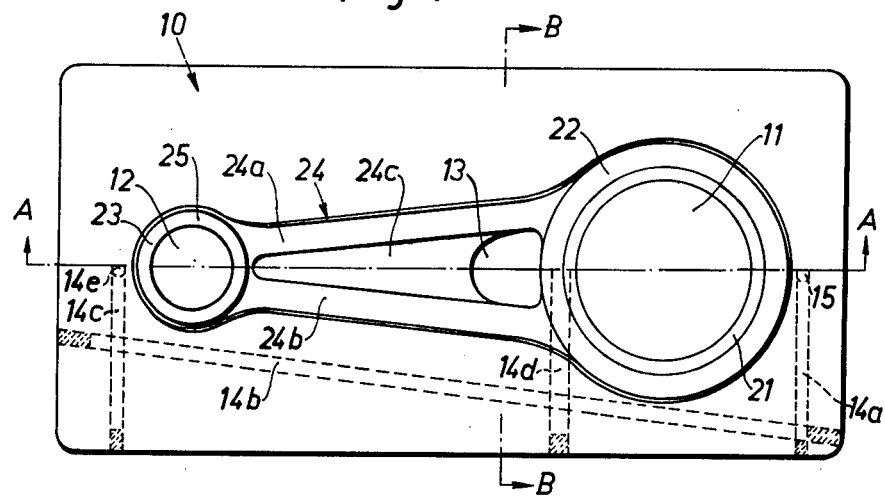
FIG. 1 is a plan view of the lower portion of a divided pressure mould according to the preferred embodiment of the invention, as when the mould has been opened just after casting with the finished connecting rod still in the mould.
Figure 2:
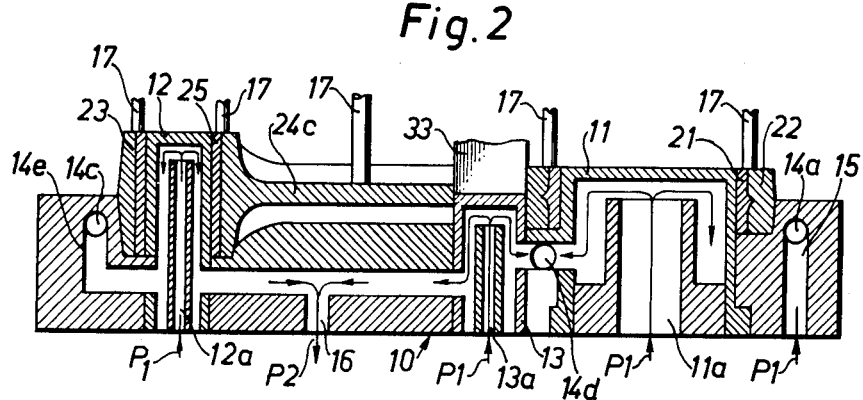
FIG. 2 is a sectional view of said lower portion of the mould with the rod in place, taken along the line A—A in FIG. 1.

As seen in FIGS. 1 and 2 a divided mould for pressure casting has a lower part 10 comprising a cooling core 11 onto which the external bearing race element 21 has been slipped before the casting. At that time, said bearing element 21 already was basically finished with a lapped or honed internal surface 21a (FIG. 3) forming the external race for the bearing rollers or needles, and with a circumferential outer ridge 21c on the external side 21b forming an engagement promoting means. At the opposite end of the mould, there is either a conventional, or in the embodiment disclosed, a similar core 12 arranged to receive thereon the piston pin bearing element 25 which is slipped onto the core 12 before casting. Since the piston pin bearing element 25 is not, according to the embodiment disclosed, of hardened steel but is of bronze or the like, it may be casted-in in a conventional manner, i.e. on a not cooled core, or even afterwards pressed into a hole in the completed, casted body.

Figure 4:
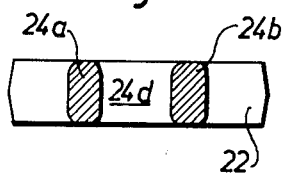
FIG. 4 is a sectional view taken along line B—B in FIG. 1.

In the mould 10 both cores 11, 12 are surrounded by voids for forming the larger connecting rod end 22 and the smaller connecting rod end 23 of the connecting rod. Between said two voids which surround the cores 11, 12 there extend recesses for forming the connecting rod shank 24, which has an "I" cross-section including web 24c and the two cantilevered ribs or flanges 24a, 24b (FIG. 4).

Between the cores 11 and 12 there is arranged in the lower mould part 10, a cooling mandrel 13 having a plan view shape as appears from FIG. 1. A mandrel 33 is provided in the upper mould part which, as shown, meets mandrel 13 when the upper mould part is in place. The upper mould part is, except for mandrel 33, omitted from the drawings for the sake of clarity. Said cooling mandrels 13, 33 have, basically, the same internal arrangements as the cooling cores 11, 12. Through supply conduits 11a, 12a, 13a pressurized cooling fluid is supplied in the direction of the arrows P1 from a source (not shown), said fluid cooling the internal walls of the cooling cores 11 and 12 and the internal walls of the cooling mandrel 13. The cooling fluid, which is also supplied via the channel 15, and passes from the mandrel, cooling cores and channel 15 through circumferential and underlying cooling channels 14a, 14b, 14c, 14d and 14e and is discharged via the channel 16. For the sake of clarity said channels have been disclosed only in the one half part of the mould in FIG. 1. It will be understood that if a single through-going cooling mandrel were substituted for mandrels 13 and 33, such mandrel would have substantially the same height dimension as the cores 11 or 12. In the upper mould part (not shown) substantially the same cooling channels are arranged as in the lower part, and the upper mould part further provided with ejectors 17.

When the cooling mandrels 13, 33 are arranged in the manner disclosed in FIG. 2, that is, having abutting front surfaces in the interconnected or closed state of the mould, or if a single through-going cooling mandrel is used, the completed connecting rod is formed with a void space 24d (FIG. 4) in the throat region of the shank where the cooling mandrel or cooling mandrels interrupt the web of the rod shank. If the cooling mandrels 13, 33 are arranged so that they in the interconnected state of the mould are separated from each other a distance corresponding to the thickness of the web, there is no significant variation noted on the completed connecting rod shaft 13. However, if the cooling mandrels 13, 33 are so arranged that they are, in the interconnected state of the mould parts, separated by less than the thickness of the web, there is obtained a portion 24c (FIG. 3) on the completed shank which is of reduced thickness and which has, of course, the same plan view outline as the above-mentioned void.

Basically, the connecting rod is in final form and ready for use after casting except for the possible pressing of the bearing bushing 25 into the smaller connecting rod end 23, if such a method of production has been elected as to this element. If necessary, the connecting rod may be straightened in a conventional manner after casting in order to obtain exact parallelism of the axes of the two bearings 21, 25, and a lubrication opening may be bored in the bearing 25, if desired.

Figure 3:
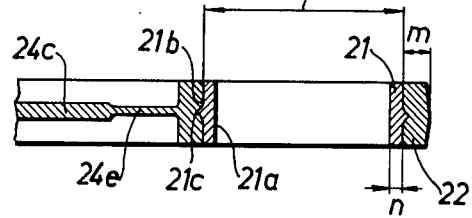
FIG. 3 is a sectional view of a portion of a finished connecting rod according to a second embodiment of the invention.

Referring to FIG. 3, the bearing race element 21 is provided with an outwardly projecting rib or ridge 21c on its external surface 21b. The element 21 has a wall thickness n, while the larger connecting rod end 22 in which the crankshaft bearing race 21 is disposed has an internal diameter d and a wall thickness m.

Although the invention has been explained with reference to a connecting rod for a combustion engine, it is obvious that the invention may be used for connecting rods intended for other types of piston machines and for other machine elements wherein at least one bearing race is arranged.

It has been found that piston rods with pre-finished hardened steel bearing races of carbon steel having annealing temperatures as low as 250° C. of or alloy steels having annealing temperatures in the general range of 600° C. may be successfully formed into piston rods of zinc base alloys, with casting temperatures in the range of 500° C., or of aluminum base alloys, having casting temperatures in the range of 900° C., according to the herein described method and apparatus, without the use of any flux on the outer surface of the race element, and that the race surface maintains its honed hard characteristics avoiding the necessity of any refinishing thereof in the completed piston rod.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. The method of producing a piston rod or the like which comprises a non-ferrous body portion and a hard ferrous material continuous bearing race element embedded in said body portion and integral therewith, which method comprises placing said race element in a mould with a hollow cooling core fittingly disposed in said race element and with a mould cavity outwardly surrounding said race element, pouring hot molten non-ferrous metal into said cavity while cooling said core by flushing the interior thereof with cooling liquid, permitting said non-ferrous metal to cool and solidify while continuing said flushing, and removing from said core and cavity said element and the resultant solidified non-ferrous metal ring formed therearound by said cavity.

2. The method of producing a piston rod or the like which comprises a continuous circular bearing race element of hard ferrous metal integrally embedded in a surrounding continuous collar of non-ferrous metal having a casting temperature higher than the annealing temperature of said ferrous metal, which method comprises the step of providing a bearing race element having a pre-finished inner race surface of hard steel and a mould comprising a hollow circular cooling core proportioned to receive said race element fittingly thereon and including mould means defining a continuous collar cavity outwardly around said core and having a diameter greater than the outer diameter of said race element, the step of placing said race element on said core, the step of thereafter pouring hot molten non-ferrous metal into said cavity while flushing the interior of said core with a cooling liquid thereby to prevent annealing of the race surface of said element, the step of, while continuing such flushing, cooling said non-ferrous metal to a temperature not higher than said annealing temperature, and the step of thereafter removing from said core and cavity said element and the resultant solidified metal collar in which said element is surroundedly embedded.

3. The method according to claim 2 wherein said cooling of said non-ferrous metal is provided in part by heat transfer through said core to said liquid flushing said interior and in part by the step of concurrently passing cooling liquid through channels through said mould arranged in proximity to said cavity.

4. The method according to claim 2 wherein said element is of steel having an annealing temperature of between about 250° C. and 600° C. and wherein the casting temperature of said non-ferrous metal is between about 500° C. and 900° C.

5. The method of producing a piston rod or the like which comprises a continuous annular bearing race element of heat-hardened ferrous metal embedded in a surrounding continuous collar of non-ferrous metal having a casting temperature higher than the annealing temperature of said ferrous metal, which method comprises the step of providing a pre-finished lapped bearing race element having a pre-finished seamless inner race surface of heat-hardened steel and a mould comprising a hollow circular cooling core proportioned to receive said race element fittingly thereon and including mould means defining a continuous collar cavity outwardly around said core with a diameter greater than the outer diameter of said race element, and a cavity corresponding to the remaining portion of the piston rod, the step of placing said race element on said core, the step of thereafter pouring hot molten non-ferrous metal into said cavities while flushing the interior of said core with a cooling liquid thereby to prevent annealing and softening of the race surface of said element, the step of, while continuing such flushing, cooling said non-ferrous metal to a temperature not higher than said annealing temperature, and the step of thereafter removing from said core and cavity said element surroundedly embedded in the resultant solidified piston rod.

6. The method according to claim 5 wherein said cooling of said non-ferrous metal is provided in part by heat transfer through said core to said liquid flushing said interior and in part by the step of concurrently passing cooling liquid through channels through said mould arranged in proximity at least to said collar cavity.

* * * * *